Feb. 27, 1962  L. MALZ ET AL  3,022,720

PUMP FOR COFFEE MAKER

Filed March 31, 1955

INVENTORS:
Leo Malz and
Alfred E. Schwancke
By:— atty.

United States Patent Office 3,022,720
Patented Feb. 27, 1962

3,022,720
PUMP FOR COFFEE MAKER
Leo Malz, Chicago, and Alfred E. Schwaneke, Northbrook, Ill., assignors to Dormeyer Corporation, Chicago, Ill., a corporation of Illinois
Filed Mar. 31, 1955, Ser. No. 498,289
7 Claims. (Cl. 99—310)

The present invention relates to coffee makers and more particularly to a percolator valve construction adapted to provide a steady and continuous infusion of water into the coffee basket of a coffee maker.

Heretofore the infusion of water in coffee percolators has often been intermittent due to the sticking or warping which occurs in standard flap valves and the lack of sufficient inlets in the valve.

Another disadvantage in currently available coffee makers is the difficulty and expense involved in manufacturing the relatively complex valves which are used.

It is accordingly an object of the present invention to provide a coffee maker adapted for continuous perking and producing a substantially continuous infusion of water into the coffee basket.

Another object of the invention is to provide a valve having a plurality of inlets which will operate to insure a sufficient supply of water through the discharge tube.

Another object is to provide a multiple ball valve construction which will overcome the problems of sticking and interruption of the infusion encountered with flat valves.

Another object is to provide a plurality of ball valves of extremely light non-adhesive construction such as for example, ball valves formed from nylon or anodized aluminum.

Another object is to provide a method of manufacturing the valves adapted to form a double interlock between inner and outer elements of the valve cage and which is simpler, more secure and more economical than the construction procedures currently available.

Another object is to provide a cage for the valve which will insure that the balls will always be in proper position for effective operation.

Another object is to provide a flow shield which will direct a stream of water into the inlet ports of the valve without turbulence and which will afford a seating means for the valve and discharge tube to provide a snug engagement between these elements and the pump.

Referring now to the drawings.

Figure 1:
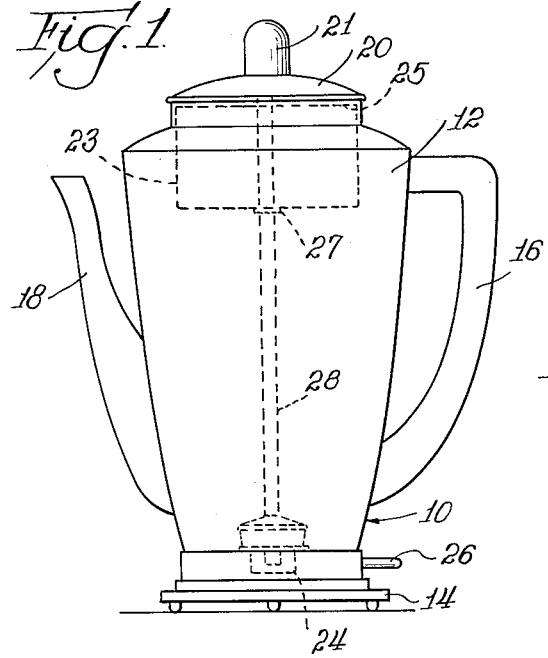
FIG. 1 is a side elevational view of a percolator according to the present invention showing the pump elements in dot and dash lines.

Referring now to FIG. 1, the coffee maker designated generally by numeral 10 comprises an outer container 12 of the usual type and includes a base portion 14, a handle 16 and a pouring spout 18 thereon. A cover 20 having a glass percolator knob 21 is firmly seated in the container 12.

A pump well or vaporizing chamber 22 is secured within the base 14 and is provided with suitable electric heating means 24 which may be a standard resistor wire surrounding the pump and bedded in an electric insulating and heat conducting material. The heating element may also for example, be provided with a suitable thermostatic switch in series therewith and terminal pins 26 extending through the wall of the base 20 to be connected, for example, by standard nut and bolt means to terminal leads for the heater.

The discharge tube 28 has its lower end supported in spaced relation to the pump well 22 by means of the valve construction of the present invention herewith described.

A material containing basket 23 having a cover 25 is supported upon the top of tube 28 by means of an annular boss 27 on said tube, for example, and the basket and cover are suitably perforated to permit water to flow therethrough. The outer cover 20 is suitably configured to receive therein the basket 23 and the basket and tube may be held in firm alignment by the snug fit between the outer cover and container 12, and the connection between the valve and pump hereinafter to be described.

Figure 2:
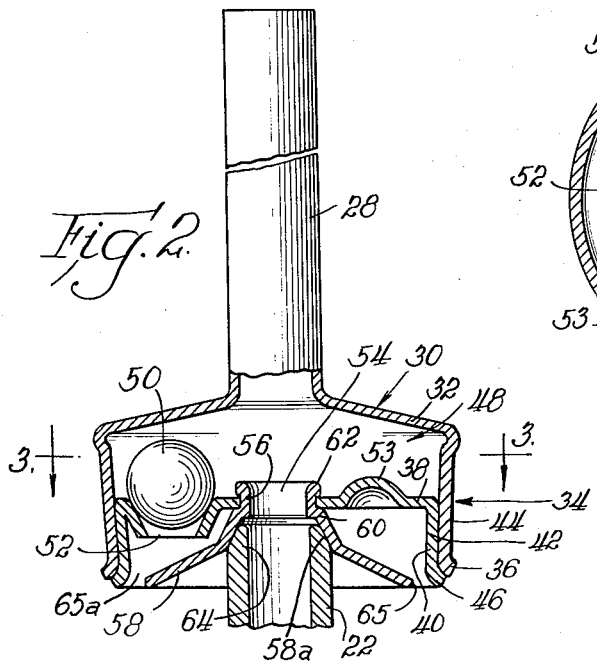
FIG. 2 is a vertical sectional view of the pump element in the percolator according to the present invention taken through the lines 2—2 of FIG. 3.

Referring now to FIG. 2, the tube 28 has secured to its lower end a valve cover 30 which has a downwardly inclined roof portion 32 and an inwardly inclined sleeve portion 34 integrally formed therewith. The sleeve portion 34 is flared outwardly at its lower edge to form an annular flange 36 and provides an inner surface which is preferably arcuate in cross section. A valve wall 38 is positioned intermediate the upper and lower edges of sleeve 34 and is held there in tight engagement with the sleeve 34 by means of a double interlock relationship resulting from the inward taper of the upper portion of the sleeve and outward flaring of the lower portion as will be described.

The wall 38 has integrally formed therewith a depending annular flange 40 having an inwardly inclined upper portion 42 seated in continuous abutting engagement with the upper portion 44 of the sleeve 34 and has an outwardly flared flange portion 46 at its lower edge whose arcuate outer surface fits snugly in complementary relation to the inner surface of flange 36. Accordingly, the depending portion 40 of wall 38 is locked against downward movement by the inwardly inclined wall 44 of sleeve 34 and flared portion 46 is locked against upward movement by flange 36 so that an extremely secure alignment of parts is produced.

The roof 32, sleeve 34 and wall 38 form a valve chamber 48 adapted to serve as a ball cage for a plurality of balls 50. The balls 50 are made of nylon or anodized aluminum and are adapted to seat in countersunk valve inlet ports 52 disposed at preferably regular intervals about the periphery of horizontal wall 38. The material from which the balls 50 are made insures that they will be readily unseated in operation since they are extremely light and free from adhesiveness.

At the same time the provision of a plurality of inlet ports in conjunction with the light non-adhesive ball valve insures that the vacuum created by each successive infusion is sufficiently strong to lift the ball valve from its seat and to provide a relatively large quantity of fluid for the charge of the next infusion.

The inlet ports 52 may be formed by stamping a plurality of conical depressions in the wall 38 and shearing the lower segments thereof so that a countersunk construction is provided adapted to form a line contact seat for the balls 50. Thus the radius of curvatures for the balls and the surface of revolution for depressions initially formed is such that any granular particles that might come to rest on the ball or the seat will be jarred loose by the action of the ball so that good closure is assured at all times.

At the same time, the stamping means used to form the conical depressions, which are thereupon sheared as above described, may be used to form a plurality of intermediate projections peripherally adjacent the countersunk ports 52. This may be accomplished by presenting the obverse side of the wall 38 to the stamping tool.

The wall 38 is spaced a distance from the cover roof 32 such that each influx of water following successive infusions will move the balls from their seats in the ports 52 a sufficient distance to open the valves fully. The projections 53 will maintain the balls against peripheral displacement and will tend to seat them again within the ports 52, since their inclined sides will roll the balls toward the ports when the balls are displaced at an angle from the vertical.

The wall 38 has a central aperture 54 therein, and the neck 56 of the conical flow shield 58 is locked therein by means of an annular shoulder 60 on the shield and a flared edge 62 on the collar 56. Thus the edge 62 maintains the balls in proper alignment radially, in cooperation with the sleeve 34. It will be appreciated that the flaring is given the edge portion 62 after the collar 56 is fully inserted in aperture 54.

The upper portion of shield 58 is contoured as at 58a to seat snugly upon the upper edge portion 64 of the vaporizing pump 22 to maintain the valve and tube in axial alignment as described and the outer portions of the shield may be flared at a somewhat wider angle so that the terminal edge 65 of the shield is spaced radially a slight distance from the terminal edges of the sleeve 34 and the depending flange 40 and in substantially the same plane therewith.

Thus the shield also forms an annular channel 65a of gradually increasing width to present an adequate supply of water to the inlet ports without the production of turbulence which would inhibit the flow.

The process of manufacturing the valve is greatly simplified by the construction described above. Thus when the shield 58 has been fastened in the wall 38 and the balls 50 have been received in the valve cover 30, flange 40 may be telescoped into sleeve 34 until it reaches a limiting position defined by the interlocking flanges 36 and 46. Thereupon the valve assembly may be mounted on a mandrel, for example, by means of the collar 56, and sleeve 34 is swaged to flange 40 to form the aforementioned inward inclination of the upper portions of sleeve 34 and flange 40. Since flange 40 can withstand the deformation thus produced without fracturing, an extremely secure double interlock is provided for the wall 38.

Figure 3:
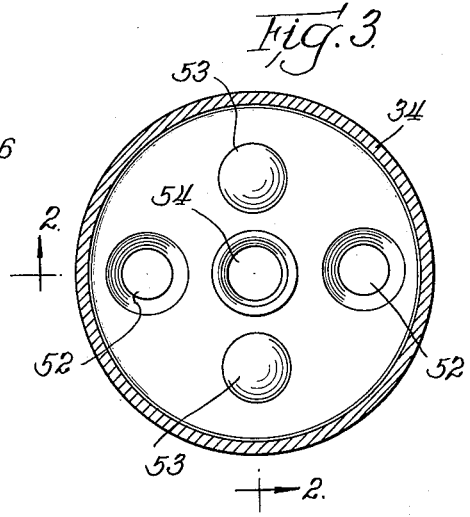
FIG. 3 is a horizontal sectional view of the valve construction of the pump taken along the line 3—3 of FIG. 2.
Figure 4:
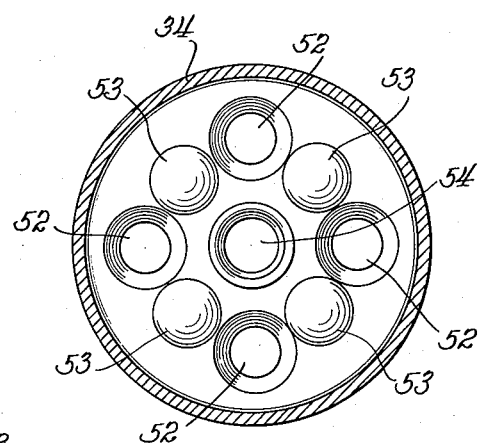
FIG. 4 is a similar view disclosing another embodiment of the invention.

In the embodiment disclosed in the drawings, in FIG. 3, two ball valves are shown but it will be appreciated that one or more valves can be used up to four ball valves. One valve because of its lightness and quickness of movement provides excellent results. The valves work as a unit because they are subjected to the same closing steam pressure simultaneously. However, the increased effective area of a plurality of valves provides an even greater infusion and steadier flow as exemplified in FIG. 4. Thus the concept of a plurality of valves having exceptionally light ball check elements insures against material interruption of the stream and prevents unsteady, intermittent operation. The result will be a better tasting coffee because it will be produced in a shorter time.

The fact that the balls will not stick in their valve seats makes possible the use of a plurality of valves without interference with the perking process. Thus the old flat valve type of construction prevented simultaneous actuation of the valves since stickiness, warping and uncertain timing were inherent therein. At the same time, the construction of the ball cage with its peripheral channel and projection adapted to roll the ball toward the ports produces prompt reseating for a subsequent infusion.

In making coffee with the percolator, a suitable amount of ground coffee is placed in the basket 23 and a suitable quantity of water is poured into the pot. Thereupon the tube 28 with the basket 23 mounted thereon is seated and centered on the pump by means of the contoured configuration of the shield. This action will, at the same time, provide a charge of water in the valve cage and tube.

Upon energizing the heating unit by connecting the terminals to an electrical outlet, the water in the vaporizing well will volatilize and force the charge of water upwardly through the discharge tube 22 and into basket 23.

Thus upward displacement and discharge of water from the lower part of the tube and the pump serves to create a momentary drop in pressure so that the water pressure will unseat the non-adhesive balls to form quickly a charge of water in the pump. This process is repeated in regular and rapid succession, since the shield element is designed to prevent turbulence, and the lightness of the balls permits them to move rapidly without sticking. The infusion of water will accordingly be steady and strong, whereby the strength of the coffee and its quality can be accurately controlled.

The simplicity of the construction means that the percolator will have a long life and consistent performance.

While the present invention has been explained and described with reference to certain principles and features, it is to be understood that the principles thereof are susceptible to considerable modification and variation. Accordingly it is not intended to be limited by illustrated examples in the accompanying drawings, or by the language in the foregoing description except as indicated in the appended claims.

What is claimed is:

1. In a percolator having a container for liquids, a discharge tube and a perforate material holding basket, and a vaporizing well, a valve cage disposed at one end of said tube, said valve cage having a valve cover, a valve wall spaced from said cover, a plurality of countersunk conical inlet ports formed in said wall and a plurality of balls adapted to removably seat in said port, said wall and cover having central apertures adapted to provide a passageway from said well through said tube, a sleeve integrally formed with said cover and having an inward taper and flared outwardly at the lower edge thereof, a depending annular flange formed integrally on said wall having inward taper complementary with the taper on said sleeve and fitting snugly in said sleeve, and having an outwardly flared edge complementary with the edge on said sleeve, said taper portions and said edge portions on said sleeve and flange forming a double-interlock whereby said wall is securely retained in said cage, a substantially conical flow shield, a collar at substantially the apex of said flow shield adapted to be retained within the central aperture in said wall having an annular shoulder formed at the base of said collar abutting said wall, a flared edge on said collar, said shoulder and last mentioned flared edge being adapted to lock said shield axially to said wall, and an upper contoured portion beneath said shoulder on said shield adapted to seat snugly on said well, said shield having its lower edge disposed substantially in the same plane as the edges of said sleeve portion and depending flange and spaced therefrom to provide an annular channel therebetween adapted to direct the flow of fluid into said inlet ports.

2. In a percolator having a container for liquids, a discharge tube and a perforate material holding basket, and a vaporizing well, a valve cage disposed at one end of said tube, said valve cage having a valve cover, a valve wall spaced from said cover, a plurality of countersunk conical inlet ports formed in said wall and a plurality of balls adapted to removably seat in said port, said wall and cover having central apertures adapted to provide a passageway from said well through said tube, a sleeve integrally formed with said cover and having an inward taper and flared outwardly at the lower edge thereof, a depending annular flange formed integrally on said wall having inward taper complementary with the taper on said sleeve and fitting snugly in said sleeve, and having an outwardly flared edge complementary with the edge on said sleeve, said taper portions and said edge portions on said sleeve and flange forming a double-interlock whereby said wall is securely retained in said cage, a substantially conical flow shield, a collar at substantially the apex of said flow shield adapted to be retained within the central aperture in said wall, an annular shoulder formed at the base of said collar adapted to abut said wall and a flared edge on said collar, said shoulder and flared edge being adapted to lock said shield axially to said wall, and an upper contoured portion beneath said shoulder on said shield adapted to seat snugly on said well, said shield having its lower edge disposed substantially in the same plane as the edges of said sleeve portion and depending flange and spaced therefrom to provide an annular channel therebetween adapted to direct the flow of fluid into said inlet ports, the said flared portion on said collar retains the balls within a peripheral channel mounted thereby and by said shield, wall and cover, and a plurality of outwardly disposed projections formed on said wall adjacent said inlet ports peripherally, said projections being adapted to return said balls in seated position in said inlet ports after each influx through said ports.

3. The construction according to claim 1 wherein said balls are formed of a light weight material.

4. The construction according to claim 1 wherein said balls have an average specific gravity compared with water within the range represented by the specific gravities of nylons and anodized aluminum.

5. The construction according to claim 2 wherein said balls have an average specific gravity compared with water within the range represented by the specific gravities of nylons and anodized aluminum.

6. In a percolator having a container for liquids, a discharge tube and a perforate material holding basket, and a vaporizing well, a circular valve cage disposed at one end of said tube, said valve cage having a valve cover opening into the tube, a lower wall means spaced from said cover having a downwardly diverging portion defining a central opening placing the vaporizing well in communication with said tube and a horizontal valve wall portion defining a plurality of circumferentially spaced countersunk conical inlet ports formed in said valve wall each placing the vaporizing well in communication with said container, and a plurality of gravity closed balls resting in said ports to open with the flow of liquid from the container to the well and to close with the flow of fluid from the well to said tube, said balls, having a diameter appreciably less than the radius of said cage and being held in working position by said cover, said balls being made of a material having an average specific gravity compared with water within the range represented by the specific gravities of nylons and anodized aluminum.

7. In a percolator having a container for liquids, a discharge tube and a perforate material holding basket, and a vaporizing well, a valve unit defining a circular compartment in communication with the tube and having a downwardly diverging lower wall portion disposed at one end of said tube apertured centrally to rest snugly centered on said vaporizing well to place said compartment in communication with the well and a valve wall portion closing said circular compartment, and a plurality of gravity closed ball valves disposed in said valve wall portion in spaced relationship peripherally around said central aperture each comprising a conical inlet port placing the compartment directly in communication with the container and a freely movable ball of a diameter less than the radius of said compartment to have a line contact with the seat, said balls being made of a material having a specific gravity compared with water within the range represented by the specific gravities of nylons and anodized aluminum.

References Cited in the file of this patent

UNITED STATES PATENTS

| | | |
|---|---|---|
| 402,627 | Smith | May 7, 1889 |
| 582,188 | Dunlap | May 11, 1897 |
| 956,481 | Chapman | Apr. 26, 1910 |
| 1,047,402 | Gefter | Dec. 17, 1912 |
| 1,175,619 | Dewey | Mar. 14, 1916 |
| 1,257,110 | Pfirman | Feb. 19, 1918 |
| 1,297,425 | Wentorf | Mar. 8, 1919 |
| 1,309,374 | Swan | July 8, 1919 |
| 1,573,668 | Wood | Feb. 16, 1926 |
| 1,696,451 | Rankin | Dec. 25, 1928 |
| 1,719,473 | Hron | July 2, 1929 |
| 2,025,302 | Olds | Dec. 24, 1935 |
| 2,120,806 | Keuffel | June 14, 1938 |
| 2,762,602 | Clair | Sept. 11, 1956 |
| 2,809,659 | Gillespie et al. | Oct. 15, 1957 |